United States Patent [19]

Sultan

[11] 4,015,271
[45] Mar. 29, 1977

[54] PRINTING HEAD FOR USE WITH AN INK JET PRINTER

[75] Inventor: Stig Bertil Sultan, Floda, Sweden

[73] Assignee: Facit Aktiebolag, Atvidaberg, Sweden

[22] Filed: Feb. 11, 1976

[21] Appl. No.: 657,037

[30] Foreign Application Priority Data

July 23, 1975 Sweden .......................... 75083865

[52] U.S. Cl. ............................ 346/140 R; 239/566
[51] Int. Cl.² ..................... G01D 15/18; B05B 1/20
[58] Field of Search ............. 346/75, 140; 239/566, 239/600

[56] References Cited

UNITED STATES PATENTS

| 2,501,724 | 3/1950 | Hughey | 239/566 X |
| 3,582,954 | 6/1971 | Skala | 346/140 X |

Primary Examiner—George H. Miller, Jr.
Attorney, Agent, or Firm—Alfred E. Miller

[57] ABSTRACT

A printing head for an ink jet printer having a plate-shaped part with opposite large surfaces provided with spaced grooves which, when assembled, form pressure chamber channels. The plate-shaped part has a recess in a side thereof whereby a second plate is inserted in the recessed position having channels which are aligned with and correspond to the pressure chamber channels of the first plate. The channels in the second plate continuously taper toward the outlet thereof to form fine capillary tubes, the latter being connected alternately to channels in one large surface and the other large surface of the first plate. The sealing of the plates is on one surface only.

2 Claims, 4 Drawing Figures

PRINTING HEAD FOR USE WITH AN INK JET PRINTER

BACKGROUND OF THE INVENTION

A printing head for an ink jet printer may be divided into two parts, i.e. a pump chamber plate and a capillary plate. However, if this construction is selected it is important that the plates are secured together in such a manner that there is no danger of leakage at the abutment between the two plates. If leakage occurs between the plates there is a real risk not only that ink may leak out but that air will penetrate into the pump chambers. If air finds its way into the pump chambers then the entire printing head may be rendered unusable since the reduction of volume in one pump chamber would not develop enough pressure to eject the desired quantity of ink, thereby causing partial or entire failure of ink jet printing due to air compression in the pump chamber.

In co-pending U.S. patent application Ser. No. 557,228, the capillary part is of such a shape that the inlet for each capillary channel is adjacent to an edge as well as to a large surface of the plate. This arrangement results in an unnecessarily complicated sealing problem.

It is therefore an object of the present invention to provide a capillary part in a capillary plate that can be reliably sealed in a printing head by a comparatively simple means.

An object of the present invention is to provide a printing head for an ink jet printer in which each channel in the second or capillary plate, at its broadest portion, opens into one short side of the plate, and the capillary tube connected to the channel opens into the opposite short side of the plate. Thus, by making the inlets and outlets of the channels in opposite sides of the capillary plate, the majority of the sealing problems with respect to the printing head have been eliminated. This is so because sealing is now required only on one surface. A reliable sealing can be accomplished in any suitable manner, for example, by gluing or ultrasonic welding.

In order that the invention will be more clearly understood, it will now be disclosed in greater detail with reference to the accompanying drawings, in which.

DESCRIPTION OF THE PREFERRED EMBODIMENT

Figure 1:
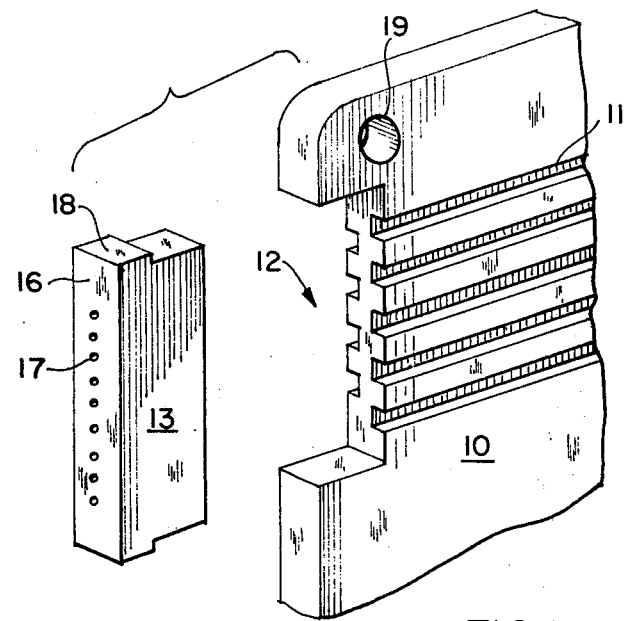
FIG. 1 is a front perspective view of the pump chamber plate and its associated capillary plate constructed in accordance with the teaching of the present invention.
Figure 2:
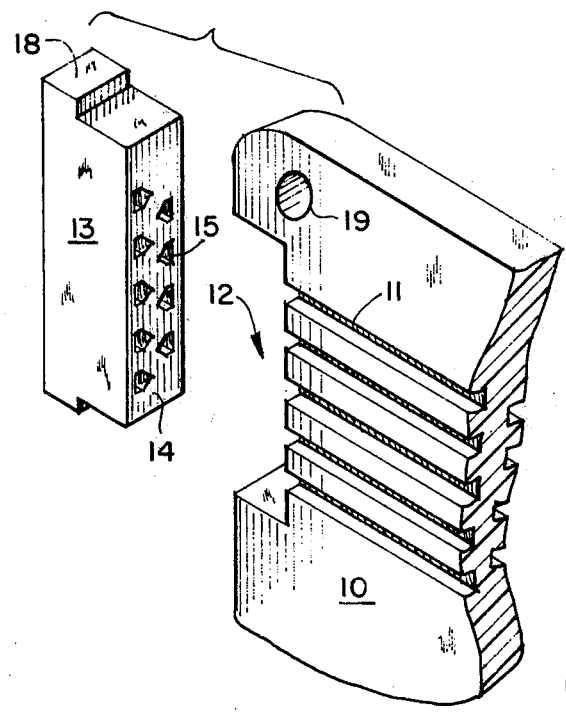
FIG. 2 is a rear perspective of the pump chamber plate and its associated capillary plate.

FIGS. 1 and 2 of the drawings show a part of a pump chamber plate 10 having two large surfaces located opposite to each other and having channels 11 extending from pump chambers (not shown) to a recessed portion 12, into which a capillary plate 13 is adapted to be inserted. As seen in FIG. 2, the plate 13 has relatively large apertures 15 in its short side 14 facing the recessed portion 12. Each aperture or opening 15 is designed to be connected to a corresponding channel 11 in the pump chamber plate when the capillary and pump chamber plates are assembled. As seen in FIG. 1, the short side 16 of the capillary plate 13 which is opposite the short side 14 is provided with capillary openings 17, each communicating with a corresponding aperture 15 in order to eject ink drops onto a paper or other printing medium by means of a known ink jet pumping device.

As seen in FIGS. 1 and 2 the capillary plate 13 has shoulders 18. FIGS. 1 and 2 also illustrate a hole 19 of which there are several in the pump chamber plate, and which are provided for fastening diaphragms and cover plates to the plate 10 in known manner by screws, rivets or the like, as shown and described in co-pending U.S. patent application Ser. No. 527,637.

Figure 3:
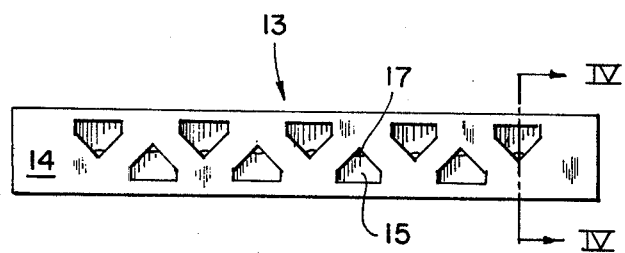
FIG. 3 is an enlarged side elevational view of the rear side of the capillary plate.

As seen in FIG. 2, the apertures 15 are spaced and disposed such that they will be connected to channels 11 alternately in one and the other large surface of the pump chamber plate 10. This arrangement is also seen in the side view of the rear short side 14 of the capillary plate shown in FIG. 3. The advantage of such a construction is set forth in co-pending U.S. patent application Ser. No. 557,228.

Figure 4:
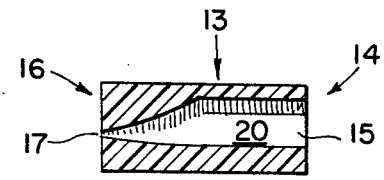
FIG. 4 is a section taken along the lines IV—IV of FIG. 3.

Referring to FIG. 4, the section taken through the capillary plate 13 illustrates the connection of an aperture 15 to the relevant capillary opening 17. The aperture 15 opens into a channel 20 whose cross-section at first corresponds to the cross-section of the opening of the aperture but then gradually decreases so that an even transition to the capillary opening 17 is achieved. However, the portion of constant cross-section can be omitted so that the gradual reduction of the channel 20 is present through the entire plate 13. The advantages of continuous transitions are known and recited in the above-mentioned U.S. patent application Ser. No. 557,228.

The particular construction developed herein substantially eliminates in a simple way the danger of air leakage into the liquid ink present in the printing head of an ink jet printer. What is claimed is:

1. A printing head for an ink jet printer having a plate-shaped part with two large oppositely located front and back surfaces, a plurality of spaced ink transport channels in each surface, said plate-shaped part being provided with a recess in one short side surface thereof and having said channels opening thereinto, a second plate adapted to be inserted in said recess and having a plurality of spaced channels which correspond to the channels in said plate-shaped part, each of said channels in said second plate tapering to form a fine capillary tube having an outlet at one short side of said second plate, said capillary tubes being operatively connected alternately to channels on the front and back surfaces of said plate-shaped part, and each channel in said second plate opening at its broadest portion only into the other short side of said second plate.

2. A printing head for an ink jet printer as claimed in claim 1 wherein each of said capillary tubes taper from an adjacent channel without discontinuities.

* * * * *